United States Patent [19]

Isozaki et al.

[11] Patent Number: 5,132,074

[45] Date of Patent: Jul. 21, 1992

[54] PROCESS OF MAKING STRETCHABLE, HEAT SHRINKABLE POLYETHYLENE FILM

[75] Inventors: Hideo Isozaki, Yatsushiro; Masumi Takahashi, Matsudo; Makoto Hirata, Sencho, all of Japan

[73] Assignee: Kohjin Co., Ltd., Tokyo, Japan

[21] Appl. No.: 393,943

[22] Filed: Aug. 15, 1989

[30] Foreign Application Priority Data

Apr. 10, 1989 [JP] Japan .................................. 1-87869

[51] Int. Cl.⁵ ........................ B29C 55/26; B29C 55/28
[52] U.S. Cl. ................................ 264/564; 264/209.5; 264/290.2
[58] Field of Search ............... 264/209.3, 209.5, 210.1, 264/211.12, 211.13, 230, 235.8, 290.2, 564, 569

[56] References Cited

U.S. PATENT DOCUMENTS 4,354,997  10/1982  Mizutani et al. ............... 264/564 X

FOREIGN PATENT DOCUMENTS 632346   12/1961  Canada ............................. 264/567
49-1784   1/1974  Japan .
52-27479  3/1977  Japan .
58-101133 6/1983  Japan .

Primary Examiner—Leo B. Tentoni
Attorney, Agent, or Firm—Armstrong & Kubovcik

[57] ABSTRACT

A stretchable, heat shrinkable ethylene-α-olefin copolymer film which has excellent stretchability as well as shrinkability at a low temperature and is useful as a good packaging material is prepared by melt extruding a composition including at least one ethylene-α-olefin copolymer as a main component to give a non-stretched film and biaxially stretching the film in a temperature region where an orientation can be induced and at an area stretching ratio of not less than 8 under conditions such that a tensile strength is from 30 to 170 kg/cm². The film has an index of refraction N of 1.500 to 1.522, a degree of orientation Wk according to X-ray diffraction method of 0.78 to 0.93 and an area shrinkage of not less than 15% at 90° C.

2 Claims, 2 Drawing Sheets

PROCESS OF MAKING STRETCHABLE, HEAT SHRINKABLE POLYETHYLENE FILM

BACKGROUND OF THE INVENTION

The present invention relates to a packaging material, and more particularly to a plastic packaging film prepared from an ethylene-α-olefin copolymer as a main component, which is excellent in stretchability and shrinkability.

Recently, a demand for stretchable films suitable for use for packaging foods such as meats, sea foods, vegetables, fruits and daily dishes has been increased with increase of the number and expansion of the scale of supermarkets and convenience stores.

Heretofore, as such a stretchable film, a plasticized polyvinyl chloride film has been most widely used, since the film has excellent properties such as excellent transparence and tackiness. However, the plasticized polyvinyl chloride film is disadvantageous in safety health or environmental pollution, for instance, it is easy to cause the loss of weight or the deterioration of an object to be packaged because of a large amount of steam permeating through the film, or it is easy to contaminate the object with the plasticizer, which are resulted from the use of a large amount of the plasticizer, or harmful gas, hydrogen chloride gas generates during the production of the film, melt-cutting of the film in the packaging production process, destruction of the film by fire, and the like.

Therefore, films substitutive for the plasticized polyvinyl chloride film are actively developed in an ethylene resin such as polyethylene or ethylene-vinyl acetate copolymer and polybutadiene.

Although the polyethylene or polybutadiene films have no disadvantage regarding the safety health and the environmental pollution, they are not fully satisfactory as a stretchable film.

For instance, a non-stretched low density polyethylene film causes a necking phenomenon that the stretched film has the stretched parts and the non-stretched parts, so the film thickness remarkably varies upon stretch packaging, and the elastic restoration is small, thus being not finely packaged objects. Further, the film strength is poor and the transparence is unsatisfactory. So, in order to improve the strength of the film or give the heat shrinkability to the film, it is attempted that the film is caused high orientation by biaxial stretching. However, the low density polyethylene has technical difficulties such that the film is broken during the biaxial stretching, therefore, the low density polyethylene film is prepared by means of the so-called inflation method. Thus, since the obtained film is not caused effective molecular orientation, it is inadequate in strength and shows a heat shrinkability only at temperatures close to its melting point.

Also, it has been tried to market films prepared form a crystalline 1,2-polybutadiene or ethylene-vinyl acetate copolymer as a main component, to which suitable additives such as an antifogging agent and a tackifier are added. However, since these films are prepared by the T-die method or the inflation method, the obtained films have no heat shrinkability or show the shrinkability only at temperatures close to their melting points. When packaging an object to be packaged with these films by a hand wrapper or a stretch automatic packaging machine, it is easy to break the films at an edge of a tray due to the poor film strength. That is, these films have not yet reached to a level that they can be substituted for the conventional films.

On the other hand, objects to be packaged have been diversified. Consequently, in case of packaging objects containing a large amount of water such as pickles or foods boiled down in soy, if the sealing is owing to only the tackiness of the film, the sealing joints of the film peel off due to water adhering, thus resulting in the loss of weight of the object, and further lowering of its market value. Accordingly, films capable of heat sealing have been required. Also, there is a case that, depending on objects to be packaged, tightly-fitted package cannot be obtained, if owing to only the stretchability of the film, remaining creases or looseness on the film. Accordingly, films having heat shrinkability as well as heat sealability have been required.

Also, from the viewpoints of requirements for higher productivity and speedup of packaging, automatic packaging machines such as stretch automatic packaging machines and shrink automatic packaging machines are rapidly replacing hand wrappers and are remarkably spreading, with increase of the number and expansion of the scale of supermarkets and convenience stores. Accordingly, films applicable to automatic packaging machines are required.

Further, from the standpoints of those in the wrapping art, there have been required films applicable to stretch packaging as well as shrink packaging, such that it is not required to replace by other films, even if an object to be packaged is changed, and having heat sealability.

An object of the present invention is to provide a film having excellent shrinkability as well as excellent stretchability, and a preparation process thereof.

This and other objects of the present invention will become apparent from the description hereinafter.

SUMMARY OF THE INVENTION

In order to obtain a film with excellent stretchability and heat sealability (the film can be sealed by a heat plate), such that the sealing joints do not peel off even if water adheres to the joints, the fine shrink packages can be obtained, and even if stretching shrinked parts after shrink packaging, the restoration of the parts is good, the present inventors conducted an earnest study. As a result, it has now been found that a film prepared from a composition comprising an ethylene-α-olefin copolymer as a main component and having a specific orientation is excellent in shrinkability as well as stretchability, and thus the present invention has been accomplished. That is, according to the present invention, there is provided a stretchable, heat shrinkable polyethylene film prepared by melt-extruding a composition comprising at least one ethylene-α-olefin copolymer as a main component to give a non-stretched film and biaxally stretching the film in a temperature region where an orientation can be induced; the stretchable, heat shrinkable polyethylene film having an index of refraction N of 1.500 to 1.522, a degree of orientation Wk of 0.78 to 0.93 according to X-ray diffraction method and an area shrinkage at 90° C. of not less than 15%, preferably from 15 to 50%, more preferably from 15 to 40%;

the index of refraction N being represented by the equation (I):

$$N = \frac{N_{MD} + N_{TD}}{2} \quad (I)$$

wherein $N_{MD}$ is an index of refraction in the machine direction and $N_{TD}$ is an index of refraction in the transverse direction, and the degree of orientation Wk being represented by the equation (II):

$$Wk = <\cos^2 \phi c, MD> + <\cos^2 \phi c, TD> \quad (II)$$

wherein $<\cos^2 \phi c, MD>$ is a degree of orientation of the crystal axis C to the machine directry of the film and $<\cos^2 \phi c, TD>$ is a degree of orientation of the crystal axis C to the transverse directry of the film.

Also, in accordance with the present invention, there is provided a process for preparing such a film.

DETAILED DESCRIPTION

Figure 1:
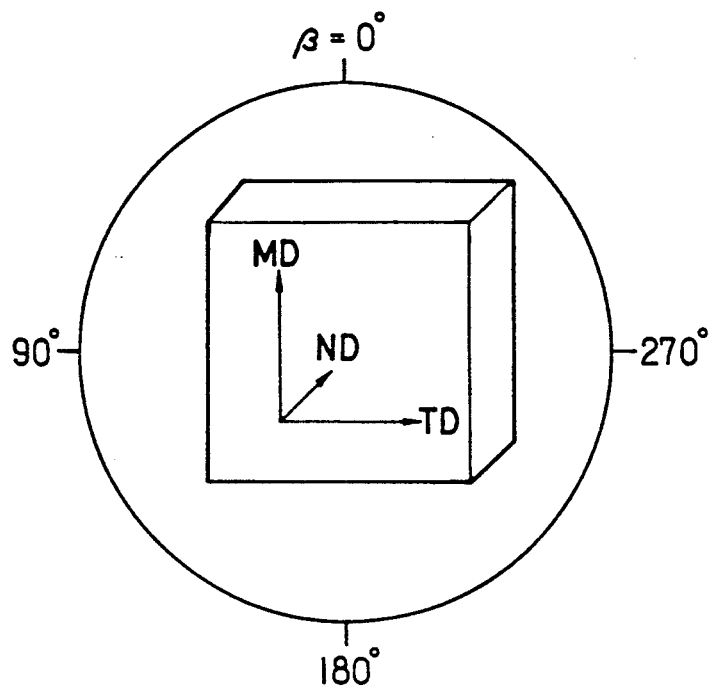
FIGS. 1 and 2 are views for illustrating a pole figue measurement according to X-ray diffraction method and FIG. 3 is a schematic diagram showing a biaxial stretching apparatus used in examples.

The ethylene-α-olefin copolymer used in the present invention is a copolymer of ethylene and at least one α-olefin having 3 to 20 carbon atoms, preferably from 4 to 12 carbon atoms. The ethylene-α-olefin copolymer may be used alone or as an admixture thereof. Examples of the α-olefin incude butene-1, pentene-1, hexene-1, octene-1, 4-methyl pentene-1, decene-1 and dodecene-1.

The α-olefin content in the copolymer is preferably in the range of 0.5 to 10% by mole.

The ethylene-α-olefin copolymer used in the invention has a density of 0.870 to 0.930 g/cm³ at 20° C., preferably from 0.890 to 0.920 g/cm³, and a melt index (MI) of 0.1 to 20 g/10 min., preferably from 0.3 to 10 g/10 min.

In the present invention, in case of a use requiring antifogging property, an antifogging agent can be added to the at least one ethylene-α-olefin copolymer in an amount of up to 5.0 parts by weight based on 100 parts by weight of the copolymers. When the amount of the antifogging agent is over 5 parts by weight, an amount of the antifogging agent bleeding on the film surface becomes much, thus resulting in lowering of the transparence or lowering of the heat sealability of the film.

Examples of the antifogging agents are, for instance, surfactants comprising mainly at least one ester of sorbitan, glycerol, polyglycerol, an addition product of ethylene oxide with sorbitan, glycerol or polyglycerol, or ethylene glycol with a fatty acid having 12 to 18 carbon atoms, and the like. Examples of the fatty acid with 12 to 18 carbon atoms are, for instance, lauric acid, myristic acid, palmitic acid, stearic acid, oleic acid, linolic acid, linolenic acid, and the like. Examples of the addition products of ethylene oxide are, for instance, addition products wherein 1 to 20 moles of ethylene oxide is added to glycerol or sorbitan, and the like. Examples of the surfactant are, for instance, sorbitan monolaurate, sorbitan monooleate, glycerol monolaurate, glycerol monooleate, diglycerol monolaurate, diglycerol monooleate, diglycerol dioleate, polyoxyethylene glycerol monostearate, polyoxyethylene glycerol monooleate, polyethylene glycol monooleate, polyethylene glycol monoparmitate, polyethylene glycol monolaurate, polyethylene glycol monostearate, polyethylene glycol dioleate, polyethylene glycol trioleate, and the like.

In the present invention, for further improving the tackiness, a tackifier can be added, as occasion demands, to the at least one ethylene-α-olefin copolymer in an amount of up to 10.0 parts by weight based on 100 parts by weight of the copolymers. When the amount of the tackifier is over 10.0 parts by weight, though the tackiness of the film is improved, the mechanical strength and the transparence of the film are lowered. Also, the roll-releasability becomes poor, so when an object is packaged by using automatic packaging machines, it is easy to cause troubles such that the film cannot suitably be supplied to the machine.

Examples of the tackifiers are, for instance, polyisobutylene, an aliphatic saturated hydrocarbon resin, an alicyclic saturated hydrocarbon resin, a polyterpene resin, rosin, rosin ester, atactic polypropylene, and the like.

It is necessary that the stretchable, heat shrinkable film of the invention have an index of refraction N represented by the equation (I):

$$N = \frac{N_{MD} + N_{TD}}{2} \quad (I)$$

wherein $N_{MD}$ is an index of refraction in the machine direction (MD) and $N_{TD}$ is an index of refraction in the transverse direction (TD) of 1.500 to 1.522 ($1.500 \leq N \leq 1.522$). The index of refraction N is measured by using an Abbé's refractometer, using diiodomethane as a mount liquid.

In order to improve the film properties such as strength as well as to give the heat shrinkability to the film, it is necessary that the index of refraction N of the film be 1.500 or more, and in order to give the stretchability as well as shrinkability at low temperature, it is necessary that the index of refraction N of the film is 1.522 or less.

Further, the stretchable, heat shrinkable film of the present invention must have a degree of orientation Wk of 0.78 to 0.93 ($0.78 \leq Wk \leq 0.93$) as well as the index of refraction N of 1.500 to 1.522. The degree of orientation Wk is represented by the equation (II):

$$Wk = <\cos^2 \phi c, MD> + <\cos^2 \phi c, TD> \quad (II)$$

wherein $<\cos^2 \phi c, MD>$ is a degree of orientation of the crystal axis C to MD of the film and $<\cos^2 \phi c, TD>$ is a degree of orientation of the crystal axis C to TD of the film.

When both the index of refraction N and the degree of orientation Wk of the film are within the above-mentioned ranges, the films desired in the present invention, having excellent stretchability as well as excellent shrinkability can be obtained. When the index of refraction N is less than 1.500, the film is not preferable in physical properties, such as poor film strength. When the index of refraction N is more than 1.522, the film is too large in tensile stress at stretching, thus resulting in occurence of trouble such that the film is slipped off from a film clip during processing in an automatic packaging machine. Further in such a case, the elastic restoration after shrink packaging is poor, so when the film subjected to shrink packaging is partially pushed with, e.g., fingers, the pushed part does not easily return to its former state. In the instant specification, the term "elastic restoration after shrink packaging" means a property of a film, after shrink packaging, capable of returning the pushed part to its former state. Concretely explaining, during display of a shrink packaged object (an article of a trade) in the shopwindow, when the article is pushed with fingers for checking up the article by customer, the pushed part does not easily return its former state, finger marks remain on the film, thus resulting in lowering its market value.

When the degree of orientation Wk is less than 0.78, even if the index of refraction N is within the range of $1.500 \leq N \leq 1.522$, the film is insufficiently caused orientation, so the heat shrinkability is poor. And when shrink packaging an object with such a film, the tight-fitted package cannot be obtained.

Also, when the degree of orientation Wk is more than 0.93, even if the index of refraction N is within the range of $1.500 \leq N \leq 1.522$, though the film has heat shrinkability, the tensile stress at stretching of the film on stretch packaging becomes too large, that is, the desired film cannot be obtained.

The degree of orientation Wk used herein is a numerical value found from a measurement of pole figue according to X-ray diffraction method. The measurement is conducted by, as shown in FIG. 1, placing a sample on the Abbe's refractometer so as to set MD of the sample in a direction of $\beta = 0° - 180°$ and TD of the sample in a direction of $\beta = 90° - 270°$, and combining Decker's transmission method and Schultz's reflection method.

A method for finding the degree of orientation according to the pole figue measurement is detailly explained in LEROY E. ALEXANDER, Polymer X-ray difraction (the first volume), translation therefrom by Ichiro Sakurada, on pages 216-232, published by Kabushiki Kaisha Kagaku Dozin.

Figure 2:
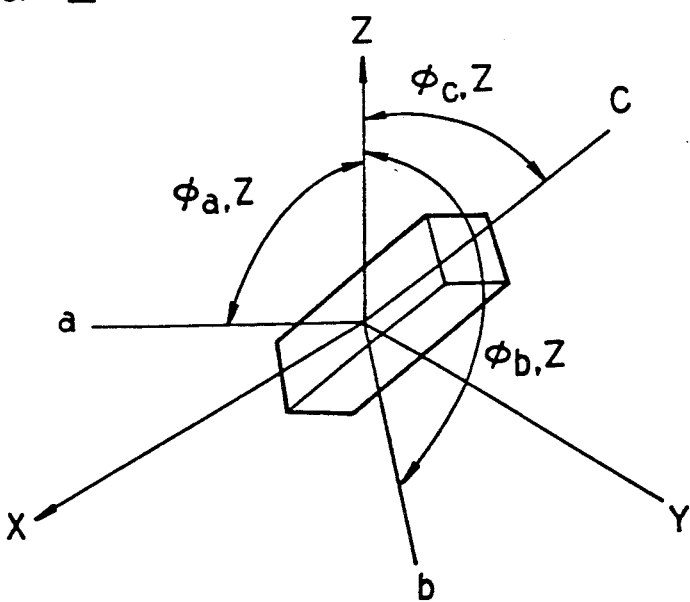

Concretely, in case of, for instance, a polyethylene, $<\cos^2 \phi c, Z>$ representing a degree of a gradient of the crystal axis C to the reference direction Z can be found by measuring diffraction strengths of independent two crystal faces(hko), since polyethylene crystal is a rhombic system. (See, FIG. 2). The measurement is conducted, using the crystal face 200 and the crystal face 020, the following four values, $Wk_1$, $Wk_2$, $Wk_3$ and $Wk_4$ are obtained.

$Wk_1 = <\cos^2 \phi(200), MD> = <\cos^2 \phi a, MD>$ $Wk_2 = <\cos^2 \phi(020), MD> = <\cos^2 \phi b, MD>$ $Wk_3 = <\cos^2 \phi(200), TD> = <\cos^2 \phi a, TD>$ $Wk_4 = <\cos^2 \phi(020), TD> = <\cos^2 \phi b, TD>$ Hereupon $$<\cos^2\phi(hkl), Z> = \frac{\int_0^{\frac{\pi}{2}} I(\phi)\sin\phi\cos^2\phi d\phi}{\int_0^{\frac{\pi}{2}} I(\phi)\sin\phi d\phi}$$

wherein $$I(\phi) = \int_0^{2\pi} I(\phi, \beta) d\beta$$

Also, since the crystal axises a, b, c of the polyethylene are at right angles to each other, the following equation (III) can be realized.

$$<\cos^2 \phi c, Z> = 1 - <\cos^2 \phi a, Z> - <\cos^2 \phi b, Z> \quad \text{(III)}$$

Accordingly $$<\cos^2 \phi c, MD> = 1 - Wk_1 - Wk_2 \quad \text{(IV)}$$

$$<\cos^2 \phi c, TD> = 1 - Wk_3 - Wk_4 \quad \text{(V)}$$

It is provided by the present inventors that the sum of the equation (IV) representing the degree of orientation in MD of the crystal axis C and the equation (V) representing the degree of orientation in TD of the crystal axis C is a degree of orientation Wk, and Wk is found by the following equation:

$$\begin{aligned} Wk &= <\cos^2\phi c, MD> + <\cos^2\phi c, TD> \\ &= (1 - Wk_1 - Wk_2) + (1 - Wk_3 - Wk_4) \\ &= 2 - (Wk_1 + Wk_2 + Wk_3 + Wk_4) \end{aligned}$$

The film having the index of refraction N of 1.500 to 1.522 and the degree of orientation Wk of 0.78 to 0.93 has an area shrinkage of 15% or more at 90° C., an elastic restoration after heat shrinking as defind below of not less than 90%. It is preferable that the area shrinkage at 90° C. of the film is from 15 to 50%, more preferably from 15 to 40%.

The production and stretching of a film for use in accordance with the present invention can be carried out in the per se known manner, and will be explained below in detail taking the production and stretching of tubular film as an example.

First, the above-mentioned composition containing the at least one ethylene-α-olefin copolymer substantially as the main component is melted by heating, kneaded and extruded into a tube which is then solidified by rapidly cooling without stretching the film to give a film which is a substantially non-stretched film.

The tubular non-stretched film thus obtained is fed to a tubular biaxial stretching equipment, by which it is expanded and stretched and, at the same time, biaxially oriented in a temperature region where an effectively high degree of orientation is induced, for example, at a temperature of 60° C. to 120° C. The film is stretched, controlling conditions so that a stretching ratio (as an area ratio) is from 8 to 25, and a tensile stress (kg/cm²) S is 30 to 170 kg/cm² ($30 \leq S \leq 170$). The tensile stress S is represented by the equation (VI):

$$S = \frac{Pd}{2t} \quad \text{(VI)}$$

wherein P is an internal pressure of a bubble (kg/cm²), d is an inside diameter of a bubble (cm) and t is a film thickness (cm). The stretching ratio may not be the same for both machine and transverse directions but preferably in order to assure satisfactory physical characeristics such as excellent strength. When the stretching ratio as the area ratio is less than 8, the obtained film is, because of small degree of orientation Wk and so, less than 1.500 of the index of refraction N, insufficient in heat shrinkability, so the satisfactory shrink package cannot be obtained. Also, the haze of the film becomes high, therefore, the value as commodity becomes lower.

On the other hand, when the stretching ratio is more than 25, the obtained film is, because of more than 0.93 of the degree of orientation Wk and more than 1.522 of the index of refraction N, too large in tensile stress of the film, so the strechability is unsatisfactory. Further, the film is insufficient in heat sealability.

When the tensile stress S is less than 30 kg/cm$^2$, the obtained film has an elastic restoration after heat shrinking of less than 90%, and is poor in elastic restoration after shrink packaging as well as is poor in stability of the stretched bubble. On the other hand, when the tensile stress S is more than 170 kg/cm$^2$, though the obtained film is excellent in heat shrinkability, it is large in tensile stress, thus resulting in poor stretchability. So, the object of the invention, to provide the film having shrinkability as well as stretchability cannot be obtained.

The film taken out from the stretching equipment may be annealed if necessary. This annealing helps control the spontaneous shrinkage of the film during storage.

The present invention is more specifically described and explained by means of the following Examples, in which all % and parts are by weight unless otherwise noted. It is to be understood that the present invention is not limited to the Examples, and various change and modifications may be made in the invention without departing from the spirit and scope thereof.

The quantitative data given in the examples were determined by the following methods.

1. Heat shrinkage at 90° C.

A square specimen, 10 cm by 10 cm, was cut out of each sample film and covered with a talc powder, which is allowed to stand in an oven maintained at a temperature of 90° C. for 15 minutes and the percent shrinkage were calculated by means of the following equation.

$$\text{Area shrinkage }(\%) = 100 - A \times B$$

where A and B represent the lengths (in cm) in the machine and transverse directions, respectively, after the specimens are allowed to stand at 90° C. for 15 minutes.

2. Elastic restoration after stretching of heat shrinked film

The film is put in a crate in a uniformly looseness state so as to become the film's area shrinkage of 15%, which is heat-treated in an oven having a temperature of 90° C. until the looseness on the film disappears to take out it from the oven. Specimens are cut out parallel to MD and TD of the film (in a width of 15 mm and a length of 200 mm) respectively and two lines are marked on the each specimen with the space of 100 mm. The specimen is attached to a tensile tester (space between chucks of 150 mm) so that the two marked lines are set between the chucks, and is elogated by 30% of the length of the shrinked film at a tensile rate of 200 mm/min. and returned to the original length at the same tensile rate as above. The specimen is taken off from the tester and is allowed to stand for 1 minute. The restoration of the film is calculated according to the following equation:

$$\text{Elastic restoration after stretching of heat-shrinked film} = \frac{130 - C}{30} \times 100(\%)$$

wherein C is a length between the two marked lines (mm) in the machine and transverse directions, respectively, after allowing the film to stand for 1 minute.

3. Packaging test

Packaging test is conducted as follows:

Two oranges are put on a tray made of a foamed polystyrene, having a width of 105 mm, a length of 195 mm and a depth of 20 mm and it is packaged by using a commercially available automatic packaging machine provided with a pleat heater and a tunnel heater for shrinking. That is, the two oranges on the tray are covered with the film, the film transversely protruding from the tray is adhered to the bottom of the tray owing to the film's tackiness, the film is cut in the streaming direction of the tray between trays, and the front and then the back of the film are tucked in the bottom of the tray, finally the bottom is heat-adhered by the pleat heater having a temperature of 95° C. Then, the tray is passed through the tunnel heater in which hot air steam of 90° C. is available for about 0.5 second to shrink the film. The results of the test are estimated according to the following criteria:

◯: There is no trouble in the automatic packaging machine and the fine, tightly-fitted package can be obtained without creases and looseness on the film.

Δ: Although there is no trouble in the automatic packaging machine, the obtained packaged object has partly creases or looseness on the film.

X: There is trouble in the automatic packaging machine such that it is difficult to release the film from a film-roll, or though there is no trouble in the machine, the sealing joint of the obtained packaged is bad or the packaged object has wholly creases or looseness on the film.

4. Heat sealability

In the above packaging test, the film is sealed with the pleat heater having a temperature of 90° C. The adhesiveness of the seal portion is observed.

◯: The seal portion sufficiently melt adheres so that if the portion is drawn apart by force, it is broken.

X: There remains parts which can peel off without breaking on the seal portion.

5. Elastic restoration after packaging

A tray with a depth of 12 mm having no content is packaged by using the same automatic packaging machine as used in the packaging test 3 under the same condition as in test 3. The center part of the film of the packaged object is pushed with a finger until the finger touches the bottom of the tray and the finger is released from the film. The time required for returning the film to the former state is measured. The estimations are as follows:

◯: The film is returned to the former state within 10 seconds.

Δ: The film is returned to the former state within 1 minute.

X: There remained the finger mark on the film and the film cannot be returned to the former state.

6. Antifogging property

After 50 ml of water having a temperature of 60° C. is poured into a 100 ml beaker, the opening of the beaker is covered with the film in the state of no crease. The beaker is allowed to stand in a refrigerator having a temperature of 5° C. for 1 hour, and the film is observed.

○: The film is not entirely clouded.

△: Although water droplets adhere partly to the film, the inside of the beaker can be seen through the film.

X: The film is clouded on the whole and the inside of the beaker cannot be seen through the film.

7. Haze

The value of haze is a percentage of a transmission of scattered light to a transmission of parallel ray. The transmissions are measured by using an integrating shere light transmission measuring device conforming to JIS K 6714.

8. Tensile stress at 30% - elongation

The tensile stress at elongation is measured at the time when the film is elongated 30% in length, according to American Society for Testing Materials (ASTM) D-882.

EXAMPLE 1

A ethylene-octene-1 copolymer with a density of 0.910 g/cm$^3$ at 25° C., a melt index of 0.8 g/10 min. and a branching coefficient of 2.1 was melted and kneaded at 170° to 240° C. and the melt was extruded in a downward direction from a circular die maintained at 240° C. The slit diameter of the circular die was 75 mm and the slit gap was 0.8 mm. The molten tubular film thus extruded was cooled while the film was guided over the outer surface of a cylindrical mandrel having an outer diameter of 66 mm as disposed just below the die and internally supplied with circulating cooling water at 20° C., with the exterior surface of the film being passed through a water bath, to thereby give a tubular unstretched film with a diameter of about 65 mm and a thickness of 180 μm.

Figure 3:
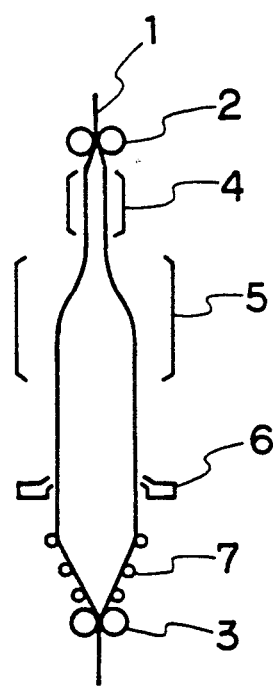

This unstretched film was guided to the biaxial stretching device illustrated in FIG. 3, where the film 1 was expanded and stretched. The voltage and current of the circular infrared heaters of the preheater 4 were adjusted so that the film temperature at the exit of the preheater was kept at 85° to 95° C.

The eight circular infrared heaters of the main heater 5 were grouped in 4 sections and the voltage and current of each section were adjusted. While an air stream was supplied along the outer surface of the tube from a cooling air ring 6 positioned below the main heater, a pressurized air was blown into the tubular film between low-speed nip rolls 2 and high-speed nip rolls 3. The pressure of the pressurized air and the relative peripheral speeds of the low-speed and high-speed nip rolls 2 and 3 were controlled so as to effect tubular stretching in a stretching ratio of 3.8 in each of the machine and transverse directions (an area stretching ratio: 14) and a tensile stress S of 70 kg/cm$^2$.

The thus stretched tubular film was collapsed through collapse rolls 7 and the nip rolls 3 and withdrawn in flattened form from the stretching apparatus and fed to a tubular annealing apparatus where the flattened film was again inflated with air and annealed for 10 seconds with a hot air blast at 75° C. from a heating cylinder, and then, cooled to room temperature through a cooling cylinder. The cooled film was collapsed again and wound up.

The resulting film had a thickness of 13 μm, an index of refraction N of 1.504, a degree of orientation Wk of 0.85, an area heat shrinkage of 36% at 90° C., and elastic restorations after heat shrinking of 96% and 96% in machine and transverse directions, respectively.

Using the above film, the packaging test as mentioned above was conducted.

The test could be stably conducted without troubles such that the film was slipped off from the film clip. Also, the film was suitably sealed by the hot bar sealer at 90° C. and the seal portion is sufficiently welded. The packaged object was fine and had no crease or looseness on the film. Further, the elastic restoration after packaging was good so that the film was returned to the former state during 2 to 3 seconds after pushing the film of the package with a finger, without remaining the finger mark on the film.

Various physical data inclusive of the above shrinkage data are shown in Table 1.

EXAMPLE 2

In the same manner as in Example 1, a composition of 100 parts of an ethylene-4-methyl pentene-1 copolymer with a density of 0.916 g/cm$^3$ at 25° C. and a melt index of 1.2 g/10 min. and a branching coefficient of 2.1 and 0.3 part of an antifogging agent of sorbitan monolaurate and polyethylene glycol monooleate (50:50 by weight) was used to prepare an unstretched film with a thickness of 260 μm which was then tubular-stretched in an area stretching ratio of 20 at a tensile stress S of 150 kg/cm$^2$ and annealed at 75° C. for 10 seconds, then cooled to room temperature to give a film.

The resulting film had a thickness of 13 μm, an index of refraction N of 1.519, a degree of orientation Wk of 0.91, an area heat shrinkage of 46% at 90° C., and elastic restorations after heat shrinking of 93% and 92% in machine and transverse directions, respectively.

Using the above film, the packaging test was conducted. There was no trouble that the seal portion of the film of the tray bottom in the packaging machine adhered with heat and was fixed, that is, the results of the test were good.

Various physical data inclusive of the above shrinkage data are shown in Table 1.

EXAMPLE 3

The formation of an unstretched film, stretching and annealing were conducted in the same manner as in Example 2 except that a composition of 100 parts of an ethylene-butene-1 copolymer with a density of 0.890 g/cm$^3$ at 25° C., a melt index of 1.0 g/10 min. and a branching coefficient of 4.9 and 0.3 part of the same antifogging agent as used in Example 2 was used to prepare an unstretched film with a thickness of 195 μm and the unstretched film was tubular-stretched in an area stretching ratio of 15 at a tensile stress S of 60 kg/cm$^2$, to give a film.

The resulting film had a thickness of 13 μm, an index of refraction N of 1.507, a degree of orientation Wk of 0.78, an area heat shrinkage of 38% at 90° C. and elastic restorations after heat shrinking of 96% and 96% in machine and transverse directions, respectively.

The results of the packaging test and other physical data are shown in Table 1.

COMPARATIVE EXAMPLE 1

In the same manner as in Example 1, a composition of 100 parts of an ethylene-octene-1 copolymer with a density of 0.912 g/cm$^3$ at 25° C., a melt index of 1.0 g/10 min. and a branching coefficient of 1.6 and 0.3 part of polyethylene glycol oleic acid ester as an antifogging agent was used to prepare an unstretched film with a thickness of 80 μm which was then tubular-stretched in an area stretching ratio of 6 at a tensile stress S of 25 kg/cm$^2$, and was annealed at 75° C. for 10 seconds and cooled down to room temperature to give a stretched film.

The resulting film had a thickness of 13 μm, an index of refraction N of 1.516, a degree of orientation Wk of 0.76, an area heat shrinkage of 11% at 90° C. and elastic restorations after heat shrinking of 85% and 86% in machine and transverse directions, respectively.

Using the film, the packaging test was conducted. Although there was no trouble such that the film was slipped off from the film clip while the film was widened and then the object to be packaged was wrapped and the seal portion of the film was satisfactorily adhered with heat and was fixed, the shrink packaged object had looseness on the film and the tightly-fitted package could not be obtained so that its market value was drastically reduced.

The results inclusive other physical data are shown in Table 1.

COMPARATIVE EXAMPLE 2

In the same manner as in Example 1, a composition of 100 parts of an ethylene-octene-1 copolymer with a density of 0.920 g/cm$^3$ at 25° C., a melt index of 1.0 g/10 min. and a branching coefficient of 0.9, 3.5 parts of an alicyclic saturated hydrocarbon resin (petroleum resin, commercially available from Arakawa Kagaku Kogyo Kabushiki Kaisha under a trade mark "ARKON P-115") and 0.3 parts of polyethylene glycol oleic acid ester as an antifogging agent was used to prepare an unstretched film with a thickness of 270 μm, then was tubular-stretched in an area stretching ratio of 27, and finally was annealed at 75° C. for 10 seconds cooled down to room temperature to give a film.

The resulting film had a thickness of 10 μm, an index of refraction N of 1.525, a degree of orientation Wk of 0.94, an area heat shrinkage of 15% at 90° C. and elastic restorations after heat shrinking of 81% and 86% in machine and transverse directions, respectively.

Using the film, the packaging test was conducted. The trouble that the film was slipped off from the film clip was frequently caused due to large tensile stress of the film during stretching of the film. Although the packaging test was conducted under conditions such that the film was not very stretched, the elastic restoration of the film after shrink packaging was poor because of poor elastic restoration after heat shrinking, and the seal portion insufficiently adhered with heat thus resulting in easy release. Further, the finger mark on the film of the heat packaged object remained, which was bad in appearance.

The results are shown in Table 1.

COMPARATIVE EXAMPLE 3

A composition of 100 parts of an ethylene-octene-1 copolymer with a density of 0.910 g/cm$^3$ at 25° C., a melt index of 0.8 g/10 min. and a branching coefficient of 2.1 and 0.3 part of the same antifogging agent as used in Example 2 was melted and kneaded at 170° to 240° C. and the melt was extruded from a 750 mm T-die. The film in the state of a sheet thus extruded was cooled down to 30° C. with a cooling roll to give an unstretched film with a thickness of 23 μm in the state of a sheet.

This unstretched film had an index of refraction N of 1.499 and a degree of orientation Wk of 0.66.

Using the unstretched film, the packaging test was conducted. Although there was no trouble such that the film was slipped off from the film clip while the film was stretched and then the object to be packed was wrapped and the seal portion of the film was satisfactorily adhered with heat and was fixed, the shrink packaged object had looseness on the film and the tightly-fitted package could not be obtained so that its market value was drastically reduced.

The results are shown in Table 1.

EXAMPLES 4 AND 5

The procedure of Example 1 was repeated except that compositions of a raw material as shown in Table 1 were used, and a thickness of an unstretched film and a stretching ratio were changed to those as shown in Table 1 to give a stretched film.

As to the film, the physical properties were measured and the packaging test was conducted in the same manner as in Example 1.

The results are shown in Table 1.

TABLE 1

| | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| α-Olefin of ethylene-α-olefin copolymer (A) | Octene-1 | 4-Methyl pentene-1 | Butene-1 | Octene-1 | Octene-1 | Octene-1 | Octene-1 | Octene-1 |
| α-Olefin of ethylene-α-olefin copolymer (B) | — | — | — | Butene-1 | — | — | — | — |
| Branching coefficient | 2.1 | 2.1 | 4.9 | 2.1 / 5.6 | 1.6 | 1.6 | 0.9 | 2.1 |
| (A)/(B) by weight | — | — | — | 80/20 | — | — | — | — |
| Anti-fogging agent Kind | — | Sorbitane monolaurate polyethylene glycol monooleate | " | " | Polyethylene glycol oleic acid ester | — | — | Sorbitane monolaurate polyethylene glycol monooleate |
| Amount (% of the copolymer) | — | 0.3 | 0.3 | 0.3 | 0.3 | 0.3 | 0.3 | 0.3 |
| Tackifier Kind | — | — | — | ARKON P115* | " | — | ARKON P115* | — |
| Amount (% of the copolymers) | — | — | — | 2.0 | 3.5 | — | 3.5 | — |
| Area stretching ratio | 14 | 20 | 15 | 16 | 12 | 6 | 27 | No stretching |
| Tensile stress at stretching S (kg/cm²) | 70 | 150 | 60 | 90 | 140 | 25 | 200 | — |
| Thickness (μm) | 13 | 13 | 13 | 10 | 15 | 13 | 10 | 23 |
| Index of refraction (N) | 1.504 | 1.519 | 1.507 | 1.510 | 1.520 | 1.516 | 1.525 | 1.499 |
| Degree of orientation (Wk) | 0.85 | 0.91 | 0.78 | 0.88 | 0.90 | 0.76 | 0.94 | 0.66 |
| Tensile stress at elongation (kg/cm²) MD | 280 | 340 | 260 | 330 | 300 | 270 | 520 | 180 |
| TD | 260 | 300 | 230 | 300 | 320 | 220 | 450 | 150 |
| Heat shrinkage at 90° C. (%) | 36 | 46 | 38 | 44 | 40 | 11 | 15 | 0 |
| Elastic restoration after heat shrinking (%) MD | 96 | 93 | 96 | 97 | 95 | 85 | 81 | 84 |
| TD | 96 | 92 | 96 | 96 | 93 | 86 | 86 | 82 |
| Packaging test | ⊚ | ⊚ | ⊚ | ⊚ | ⊚ | X○ | XX | X○ |
| Heat sealability (by 90° C.-plate heater) | ○ | ○ | ○ | ○ | ○ | X | X | X |
| Elastic restoration after packaging | ○ | ○ | ○ | ○ | ○ | ○ | ○ | ○ |
| Antifogging property | 0.9 | 0.7 | 1.1 | 0.9 | 1.2 | 2.3 | 1.1 | 1.9 |
| Haze (%) | | | | | | | | |

(Note)
*Petroleum resin (an alicyclic saturated hydrocarbon resin) available from Arakawa Kagaku Kogyo Kabushiki Kaisha In addition to the elements used in the Examples, other elements can be used in the Examples as set forth in the specification and the drawings to obtain substantially the same results.

What we claim is:

1. A tubular process for preparing a stretchable, heat shrinkable ethylene-α-olefin copolymer film having an area shrinkage of not less than 15% at 90° C. and an elastic restoration after stretching of heat shrinked film of not less than 90%; which comprises:

melt extruding a composition comprising at least one ethylene-α-olefin copolymer as a main component to give a non-stretched tubular film and biaxially stretching a bubble of the tubular film by means of an internal gas pressure in a temperature region where an orientation can be induced and at an area stretching ratio of not less than 8 under conditions such that a tensile stress (kg/cm$^2$) S on the film is from 30 to 170 kg/cm$^2$, said tensile stress S being represented by the equation:

$$S = \frac{Pd}{2t}$$

wherein P is the internal pressure of the bubble (kg/cm$^2$), d is an inside diameter of the bubble (cm) and t is the film thickness (cm).

2. A process for preparing a stretchable, heat shrinkable ethylene-α-olefin copolymer film having an area shrinkage of not less than 15% at 90° C. and elastic restoration after stretching of heat shrinked film of not less than 90%; which comprises:

melt extruding a composition comprising at least one ethylene-α-olefin copolymer as a main component to give a non-stretched film and biaxially stretching the film in a temperature region where an orientation can be induced and at an area stretching ratio of not less than 8 under conditions such that a tensile stress (kg/cm$^2$) on the film is from 30 to 170 kg/cm$^2$.

* * * * *